United States Patent
Fields et al.

(12)

(10) Patent No.: US 6,280,808 B1
(45) Date of Patent: Aug. 28, 2001

(54) PROCESS AND APPARATUS FOR FORMING PLASTIC SHEET

(75) Inventors: Steven David Fields, Yardley, PA (US); Garo Khanarian, Princeton; Jeffrey Lawrence Daecher, Sicklerville, both of NJ (US); Alan Daniel Stein, Newton, MA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/320,121

(22) Filed: May 25, 1999

(51) Int. Cl.[7] .................................................... B32B 3/00
(52) U.S. Cl. ...................... 428/64.1; 428/64.2; 428/64.4; 428/412; 428/913; 430/272.11; 430/495.1; 430/945
(58) Field of Search .................. 428/64.1, 64.2, 428/64.4, 913, 412, 421, 423.1, 474.1; 430/270.11, 495.1, 945; 528/196, 198

(56) References Cited

U.S. PATENT DOCUMENTS

| | | |
|---|---|---|
| 1,631,805 | 6/1927 | Ferngren . |
| 1,753,768 | 4/1930 | Blair . |
| 1,772,448 | 8/1930 | Allen . |
| 1,829,641 | 10/1931 | Ferngren . |
| 1,836,394 | 12/1931 | Reece . |
| 1,841,579 | 1/1932 | Fraser . |
| 1,872,550 | 8/1932 | Allen . |
| 1,891,371 | 12/1932 | Danner . |
| 1,891,373 | 12/1932 | Danner . |
| 3,149,949 | 9/1964 | Dockerty et al. ................ 65/53 |
| 3,451,798 | 6/1969 | Simon ............................ 65/199 |
| 3,537,834 | 11/1970 | Simon ............................ 65/199 |
| 4,246,374 | 1/1981 | Kopchik ......................... 525/329 |
| 4,450,553 | 5/1984 | Holster et al. ................. 369/275 |
| 4,727,117 | 2/1988 | Hallden-Abberton et al. ...... 525/343 |
| 5,076,987 | 12/1991 | Wank et al. .................... 264/210.2 |
| 5,149,481 | 9/1992 | Gross et al. ................... 264/210.2 |
| 5,202,875 | 4/1993 | Rosen et al. ................... 369/94 |
| 5,242,742 | 9/1993 | Funk et al. .................... 428/215 |
| 5,263,011 | 11/1993 | Maeda et al. .................. 369/44.27 |
| 5,286,436 | 2/1994 | Funk et al. .................... 264/210.2 |
| 5,373,499 | 12/1994 | Imaino et al. ................. 369/275.4 |
| 5,627,817 | 5/1997 | Rosen et al. ................... 369/58 |
| 6,001,953 | * 12/1999 | Davis ............................ 528/196 |
| 6,028,161 | * 2/2000 | Otsuji ........................... 528/196 |

* cited by examiner

Primary Examiner—Elizabeth Evans
(74) Attorney, Agent, or Firm—S. Matthew Cairns; Darrly P. Frickey; John L. Lemonowicz

(57) ABSTRACT

Disclosed is an apparatus for formation of high quality plastic sheet in a continuous fashion. Also disclosed are a variety of optical and electronic display applications for high quality plastic sheet produced in a continuous fashion.

13 Claims, 5 Drawing Sheets

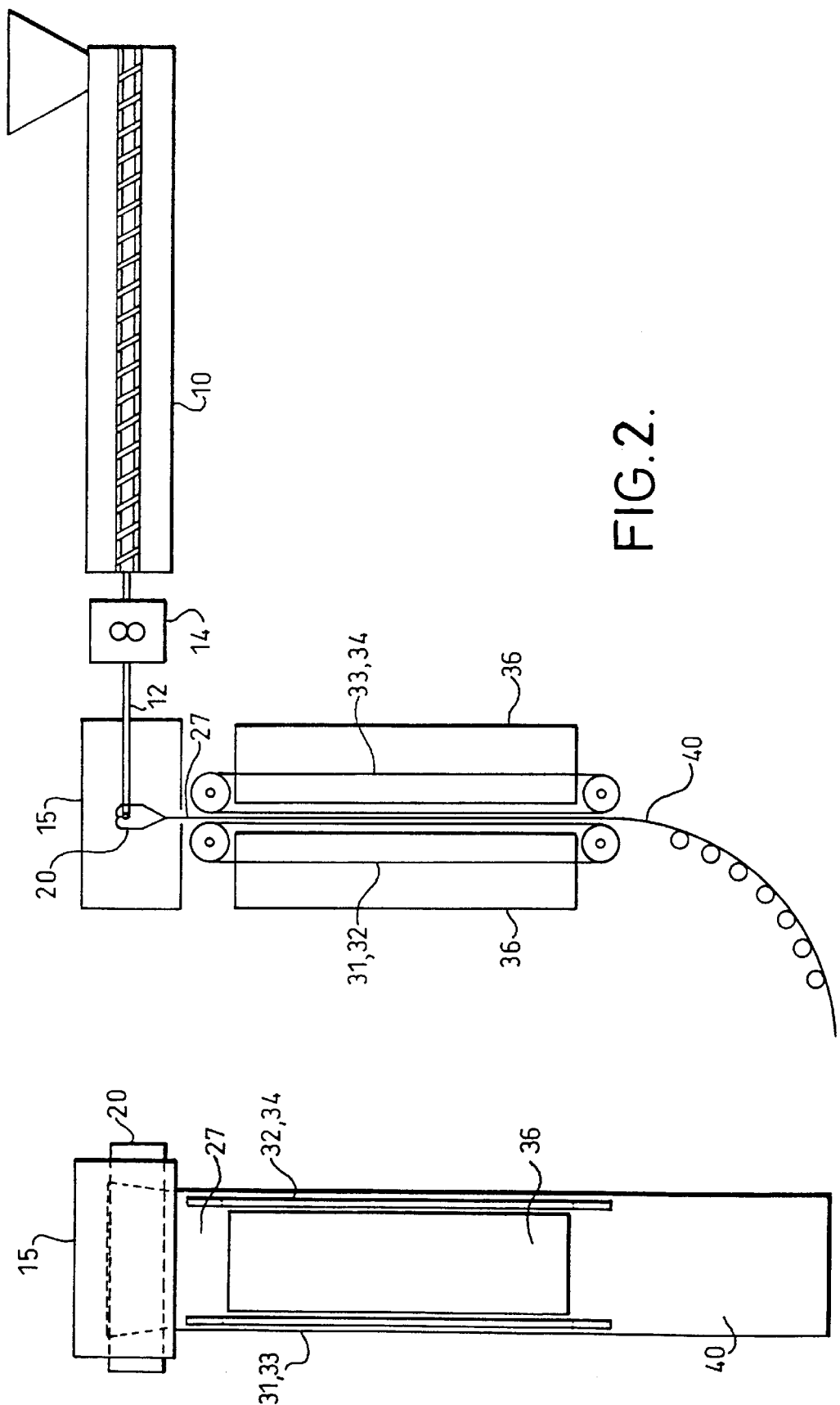

PROCESS AND APPARATUS FOR FORMING PLASTIC SHEET

BACKGROUND OF THE INVENTION

The present invention relates to a process and apparatus for forming plastic sheet. In particular, the present invention relates to a process and apparatus for forming plastic sheet having low residual stress and high surface quality. Plastic sheet formed according to the process of the present invention is particularly useful in optical and electronic display applications, such as, for example, optical windows, optical filters, recording media, and liquid crystal displays ("LCD").

Sheets of optical quality glass or quartz are used in electronic display applications as "substrates." In such applications, a "substrate" is a sheet of material used to build an electronic display. Such substrates can be transparent, translucent or opaque, but are typically transparent. In general, such sheets have conductive coatings applied thereto prior to use as substrates. Such substrates often have stringent specifications for optical clarity, flatness and minimal birefringence, and typically must have high resistance to gas and solvent permeation. Mechanical properties such as flexibility, impact resistance, hardness and scratch resistance are also important considerations. Glass or quartz sheets have been used in display applications because these materials are able to meet the optical and flatness requirements and have good thermal and chemical resistance and barrier properties; however, these materials do not have some of the desired mechanical properties, most notably low density, flexibility and impact resistance.

Because of the mechanical limitations of glass or quartz sheet in optical or display applications, it is desirable to use plastic sheet in such applications. Although plastic sheets have greater flexibility, are more resistant to breakage, and are of lighter weight than glass or quartz sheets of equal thickness, it has been very difficult to produce plastic sheet having the requisite optical specifications needed for use in optical and display applications at reasonable costs. Moreover, many types of plastic sheet undergo unacceptable dimensional distortion when subjected to substrate processing conditions during manufacture of the display devices, particularly with respect to temperature.

There are several commercially utilized methods for producing plastic sheet and film, including casting, extrusion, molding, and stretching operations. Of these methods, several are not suitable for producing high quality plastic sheet. As used throughout this specification, the term "high quality" is used to describe plastic sheet having the following characteristics: low surface roughness, low waviness, low thickness variation, and minimal amount of polymer chain orientation (for example, as measured by asymmetric physical properties, birefringence or thermal shrinkage).

For example, injection molding is likely to produce high amounts of polymer chain orientation, especially for thin sheets (i.e., 1 mm thickness or less), due to the flow of molten plastic into the mold, which unacceptably increases birefringence for polymers with non-negligible photoelasticity (stress optic) coefficients. Injection compression molding is an improved molding process which allows squeezing of the polymer after injection for the purpose of improving surface quality and reducing polymer chain orientation. However, even with these improvements, injection compression molding has limited ability to produce high quality sheet.

Compression molding and press polishing may be used to produce sheets with good surface quality; however, the squeezing flow inherent in such processes results in polymer chain orientation which results in unacceptable shrinkage during thermal cycling. Moreover, these processes are not continuously operable and therefore increase labor and production costs.

Stretching operations (for example, for the production of uniaxially- or biaxially-oriented films) and blown film extrusion inherently introduce large amounts of polymer chain orientation and are unsuited for the production of high quality plastic sheet.

Solvent casting can be used to produce high quality film; however, there are practical limitations to the maximum film thickness which can be produced by this method. In addition, the solvent used in the casting must be removed after formation of the sheet.

Sheet extrusion is run as a continuous operation, but this process introduces unacceptable polymer chain orientation due to the nature of the polymer flow in the die and between the polished rollers in the roll stack.

There is therefore a continuing need for a method for producing relatively inexpensive, high quality plastic sheet in a continuous fashion, wherein the resultant plastic sheet is capable of use as a substrate in optical and electronic display applications.

STATEMENT OF THE INVENTION

The present invention is directed to an optical storage medium comprising one or more layers of high quality plastic sheet; a reflective or semireflective layer disposed on at least one side of the sheet; and optionally a protective layer disposed on at least one side of the sheet; wherein the plastic sheet is produced by the process comprising the steps of: a) providing molten plastic resin; b) directing the molten plastic resin to an overflow die having an inlet and an outlet; c) shaping the molten plastic resin into a molten web using said overflow die; d) guiding said molten web away from said overflow die; and e) cooling said molten web to form a solid sheet.

The present invention is also directed to an apparatus for producing high quality plastic sheet, comprising: a) a source for providing molten plastic resin; b) an overflow die having a length and a width, comprising: a substantially egg-shaped cross-section culminating in an apex, a conduit opening, and a metering arrangement connected with said conduit opening, wherein the molten plastic resin flows into the die through the conduit opening, out of the die through the metering arrangement, and around the sides of the die to form a molten web at said apex; c) means for delivering said molten plastic resin from said source to said overflow die; d) guidance means for guiding said molten web away from said overflow die; e) means for filtering disposed between said delivery means and said overflow die; and f) means for mixing disposed between said filter means and said overflow die.

The present invention is further directed to a substrate for liquid crystal display comprising a high quality plastic sheet having an electronic component disposed on at least one side of the sheet; wherein the plastic sheet is produced by the process comprising the steps of: a) providing molten plastic resin; b) directing the molten plastic resin to an overflow die having an inlet and an outlet; c) shaping the molten plastic resin into a molten web using said overflow die; d) guiding said molten web away from said overflow die; and e) cooling said molten web to form a solid sheet; provided that when the plastic resin is a polycarbonate, it does not contain as bisphenol components (1) 1,1-bis(4-hydroxyphenyl)-3,3,5- trimethylcyclohexane; (2) a mixture of 2,2-bis(4-hydroxyphenyl)propane and 1,1-bis(4-hydroxyphenyl)-3,3,5-trimethylcyclohexane; a blend of (1) and (2); or a blend of (1) or (2) with a second polycarbonate containing as a bisphenol component 2,2-bis(4-hydroxyphenyl)propane.

The present invention is further directed to a magnetic storage medium comprising a high quality plastic sheet having a magnetic layer disposed on at least one side of the sheet; wherein the plastic sheet is produced by the process comprising the steps of: a) providing molten plastic resin; b) directing the molten plastic resin to an overflow die having an inlet and an outlet; c) shaping the molten plastic resin into a molten web using said overflow die; d) guiding said molten web away from said overflow die; and e) cooling said molten web to form a solid sheet.

The present invention is further directed to a 3-dimensional optical storage medium comprising a high quality plastic sheet having dispersed therein one or more pigments, dyes or mixtures thereof, wherein the pigments, dyes or mixtures thereof undergo a change in optical properties locally upon exposure to light; wherein the optical storage medium is produced by the steps of: a) providing molten plastic resin; b) directing the molten plastic resin to an overflow die having an inlet and an outlet; c) shaping the molten plastic resin into a molten web using said overflow die; d) combining the dye, pigment or mixture thereof with the molten plastic resin prior to shaping the molten resin into a web using said overflow die; e) guiding said molten web away from said overflow die; and f) cooling said molten web to form a solid.

The present invention is still further directed to a method of preparing an optical storage medium having information encoded thereon comprising the steps of producing a high quality plastic sheet by the process comprising the steps of: a) providing molten plastic resin; b) directing the molten plastic resin to an overflow die having an inlet and an outlet; c) shaping the molten plastic resin into a molten web using said overflow die; d) guiding said molten web away from said overflow die; e) cooling said molten web to form a solid sheet; coating the sheet with a polymer film; and encoding information on the coated sheet by embossing.

The present invention is further directed to a light management film comprising a high quality plastic sheet having a structured surface, wherein the film is produced by the steps of: a) providing molten plastic resin; b) directing the molten plastic resin to an overflow die having an inlet and an outlet; c) shaping the molten plastic resin into a molten web using said overflow die; d) guiding said molten web away from said overflow die; e) cooling said molten web to form a solid sheet; and f) providing a structured surface to the sheet before, during or after cooling.

BRIEF DESCRIPTION OF THE DRAWING

FIG. 1 is a frontal view of a typical apparatus of the present invention.

FIG. 2 is a side view of the apparatus of FIG. 1.

FIG. 3A is a perspective view of the die with heating manifold attached.

FIG. 3B is a top view of the die; and

FIG. 3C is a side view of the die.

FIG. 5 illustrates an overflow die having a series of holes in place of the slot 22 of die 20;

FIG. 6 illustrates an overflow die having a non-tapering slot; and

FIG. 7 illustrates an overflow die having a "coat hanger" arrangement.

DETAILED DESCRIPTION OF THE INVENTION

Figure 3A:
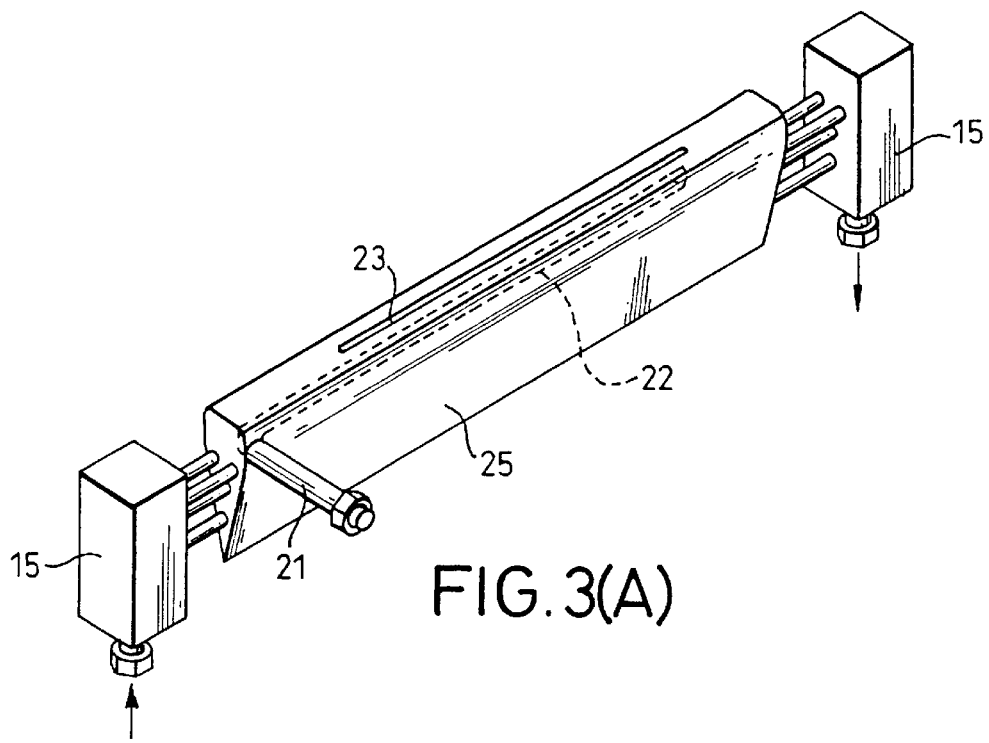
FIGS. 3A–3C are close-ups of overflow die 20.
Figure 3B:
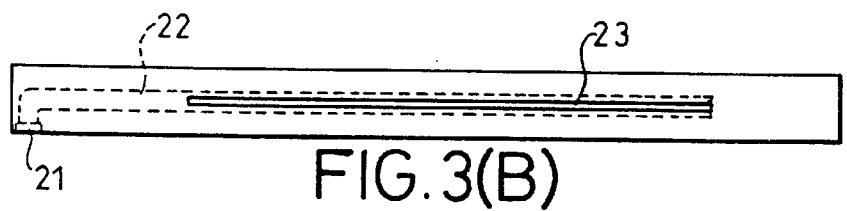
Figure 3C:
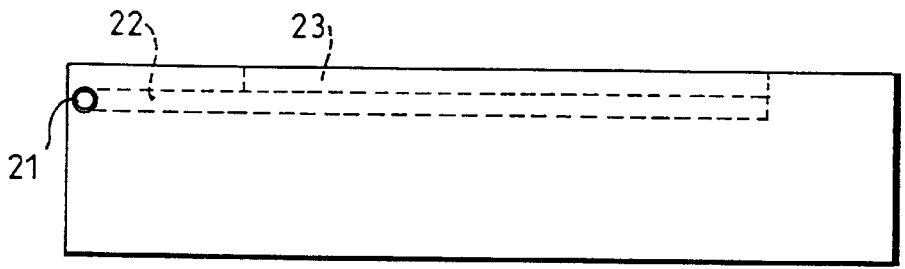
Figure 4:
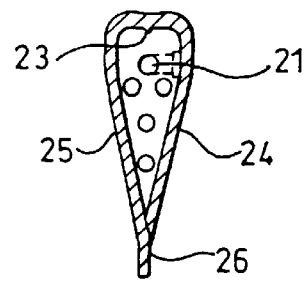
FIG. 4 is a cross-sectional view of overflow die 20.

As used in this specification, the following terms have the following definitions, unless the context clearly indicates otherwise. "Glass transition temperature" or "Tg" is the midpoint of the narrow temperature range over which polymers change from being relatively hard and brittle to relatively soft and viscous (rubbery). "Plastic" refers to polymer, such as thermoplastic polymers, which can form sheets. The terms "polymer" and "resin" are used interchangeably throughout the specification. "Sheet" refers to a sheet having a thickness of about 25 mm or less, and is intended to include "films" (sheets having thickness of <0.5 mm). "Shrinkage" refers to an irreversible dimensional change that occurs in a sheet subjected to a heat-cool cycle. The terms "Bisphenol A" and "2,2-bis(4-hydroxyphenyl)propane" are used interchangeably throughout the specification. "Bisphenol A polycarbonate" refers to a polycarbonate containing bisphenol A and phosgene. The following abbreviations are used in the specification: cm=centimeter(s); mm=millimeter(s); NE=nanometer(s); µ=micron(s) (micrometers); g=gram(s); mL=milliliters; Pa=Pascals; kPa=kiloPascals; Pa-s=Pascal-seconds; sec=second(s); min=minute(s); hrs=hour(s); UV=ultraviolet, and IR=infrared. All temperature references are ° C. unless otherwise specified. Ranges specified are to be read as inclusive, unless specifically identified otherwise.

The high quality plastic sheet formed by the process of the present invention can be used in a number of applications, including but not limited to: substrates for electronic display devices, such as LCD and electroluminescent displays; substrates for microoptic lens arrays and light directing films; optical windows and filters; waveguide optics; substrates for optical, magnetic, chemical or other types of storage or recording media; substrates for imaging, such as for photographic or x-ray applications; substrates for diagnostic systems; and substrates for electronic circuits.

A sheet or film of the present invention is suitable for use as a substrate of an electronic display device, for example a liquid crystal display device. Such substrates are often coated with one or more coating layers prior to applying a conductive coating, or a layer of active electronic devices, for example thin film transistors or diodes. The types of coatings that may be applied include crosslinked coatings, barrier coatings and conductive coatings.

A crosslinked coating layer may improve solvent resistance, abrasion resistance, and may promote adhesion between the plastic substrate and a subsequent coating layer (for example, between an organic and an inorganic coating). Crosslinked coating layers, if used, may be applied to one or both sides of the plastic substrate.

A barrier layer is a coating which reduces gas or moisture permeation. The composition of a barrier layer may be organic, or inorganic. A barrier coating may also be useful as a solvent resistant coating if the material of the barrier coating is solvent resistant and can prevent or reduce significantly the migration of such solvent(s) to the plastic sheet. Barrier layers, if used, may be applied to one or both sides of the plastic sheet.

The substrate of the present invention may be coated with a conductive layer for use in optical displays. For example, if the substrate is to be used in a liquid crystal display (LCD), an electronic component is required on at least one side of the substrate. Typically, the electronic component is applied only to one side of the substrate, the side which will be "inside" the LCD cell and closest to the liquid crystal. In the alternative, the electronic component may be applied to both sides of the substrate. In another embodiment, one or more layers of protective coatings, color filter coatings, or barrier coatings are disposed between the substrate and the electronic component. Suitable electronic components include, but are not limited to a layer of active electronic devices or a conductive layer. Such substrates comprising a layer of active electronic devices are especially suitable for use in LCDs.

Substrates of the present invention may be incorporated into a liquid crystal display cell by incorporating materials and processes similar to those in W. C. O'Mara, *Liquid Crystal Flat Panel Displays*, Van Nostrand Reinhold, New York (1993). The process of forming a liquid crystal cell from substrates may include one or more of the following steps: patterning a clear conductive film on at least one substrate using a photolithographic process, applying a liquid crystal alignment material to the conductive coating on the two substrates, rubbing the alignment layers to impart the alignment characteristics to the substrates, applying spacer particles to at least one substrate, applying an edge seal to at least one substrate, contacting the two substrates in the proper orientation with conductive layers facing each other, curing the edge seal, injecting liquid crystal into the narrow gap formed between the substrates, and sealing the gap. The substrates of the present invention may be used in all types of liquid crystal display cells, including those types that incorporate a composite of liquid crystal and polymer, those for which the display picture elements are addressed actively by electronic devices on the substrate (active matrix displays), and those for which the display picture elements are addressed passively (so called passive matrix displays).

The sheet of the present invention is suitable for use as a substrate in optical storage media. Suitable optical storage media include, but are not limited to: compact discs, recordable compact discs, read/write compact discs, digital versatile discs, recordable digital versatile discs, read/write digital versatile discs, and magneto-optical discs.

Compact discs ("CD") and digital versatile discs ("DVD") contain information encoded as pits and grooves on a polymer substrate. The sequence and length of pits encode information which is read with a focused laser beam through the substrate. In the typical manufacture of compact discs, the pits and grooves are replicated from a stamper in a mold onto the substrate. Once the substrate has been molded, it is then metallized by the deposition of a thin layer of reflective material, such as aluminum or gold. The substrate may then optionally be coated with a lacquer or resin to which ink may be applied, such as to provide a label. Advances in optical data storage require the encoding of increased amounts of information, which decreases the spacing between the pits and grooves. In order to prevent errors in the reading of such closely packed information (that is, high density), it is important that the substrate be of a sufficiently high quality that it does not deform around the pits and grooves during manufacture or writing, in the case of writeable discs. Such deformations cause errors in the reading of the encoded information. An advantage of the present invention is that the high quality optical plastic sheet produced has lower birefringence, lower surface roughness and higher dimensional stability than known injection molded substrates. This allows for a higher density of encoded information with very little deformation around the pits and grooves, provides for the writing and reading of encoded information without optical distortion, and gives greater signal to noise ratios.

DVD's are generally produced in the same way as compact discs, but may further have an added semireflective layer and polymer layer to encode one or more additional layers of information on top of the first (replicated) surface. Also, DVD's may have two or more discs bonded together with a transparent adhesive to increase the information content. Typically, DVDs comprise two to four layers.

When the sheet of the present invention is used as a substrate in an optical storage medium, the optical storage medium comprises a) a high quality plastic sheet produced by the present method; b) a reflective or semireflective layer disposed on at least one side of the sheet; and optionally c) a protective layer disposed on at least one side of the sheet. The reflective or semireflective layer may be formed from any reflective or semireflective material. When a reflective layer is used, it is preferred that the reflective layer comprise a metal, such as aluminum or gold. Such reflective layer is typically applied to the substrate by sputtering or vacuum deposition. When a semireflective layer is used, it is preferred that the semireflective layer comprises a metal. Suitable metals for use in semireflective layers include, but are not limited to gold, aluminum, and metal alloys, such as aluminum alloys. When metals are used as the semireflective layer, only a very thin layer of the metal is required. The protective layer may be any coating applied to the plastic substrate or reflective layer that does not interfere with the desired optical properties. It is preferred that the protective layer is a lacquer or resin. It is further preferred that the plastic substrate is selected from the group consisting of homopolymers and copolymers of polycarbonate, polystyrene, polyacrylic, polyester, polyolefin, polyacrylate, and mixtures thereof.

Information may be encoded on optical storage media comprising the sheet of the present invention by any known means, such as embossing or imaging. For example, optical storage media may be prepared by hot embossing processes, such as those described in M. T. Gale, *Micro-Optics*, (Ed . H. P. Herzig), Taylor & Francis, London, UK, chapter 6, (1997). Hot embossing uses a heated stamper to encode information on the substrate. The hot stamper may be used in a continuous process (roll to roll) or in a discrete process, such as compression molding. In the alternative, the substrate may first be coated with a thin polymer film prior to embossing. Suitable polymer films include, but are not limited to: latexes, photopolymers, and ultraviolet curable resins. The thickness of the polymer coating is generally 0.05 to 10 microns, and preferably 0.1 to 1 microns. Such a polymer film results in faster embossing with better replication of the encoded information.

In the alternative, a photopolymer may be used to encode information on optical storage media. When a photopolymer is used, it is first coated on the substrate. The coated substrate is then imaged using any lithographic process known in the art, such as those used in the semiconductor industry.

After the information is encoded on the substrate, the substrate is coated with a reflective or semireflective layer, and optionally coated with an ultraviolet curable resin to protect the reflective or semireflective surface. The reflective or semireflective layer may be applied by sputtering or vacuum deposition. In the preparation of DVD's, the encoded substrate is preferably coated with a semireflective layer. The reflective or semireflective surface on the final layer is typically coated with an ultraviolet curable resin.

Pits used to encode information can be 0.01 to 1 microns deep and preferably 0.04 to 0.15 microns deep, and 0.4 to 10 microns long. Optical storage media are typically up 0.6 to 1.2 millimeters thick. The birefringence of the substrate used in optical storage media is typically less than 50 nanometers, and preferably less than 30 nanometers.

The high quality sheet produced by the present process is useful as a substrate for optical phase-change media. Optical phase-change media are those which can be written once and read many times and those which can be written and read many times. Suitable optical phase-change media include, but are not limited to: record once compact discs ("CD-R"), record once digital versatile discs ("DVD-R"), magnetooptical media ("MO"), and phase change media ("PD"), read/write compact discs ("CD-RW"), and read/write digital versatile discs ("DVD-RW"). For example, various phase-change media are disclosed in H. Bennett, Emedia Professional, Online Inc., Wilton, Conn., July, 1998, page 31. Optical phase-change media typically consist of a high quality substrate with a spiral groove for laser tracking purposes, a reflective or semireflective layer, a phase-change medium disposed between the substrate and the reflective or semireflective layer and a UV curable protective coating for the reflective or semireflective layer.

Information is encoded onto a phase-change medium by focusing a laser beam on a submicron spot on the reflective layer to either cause distortions (i.e. create pits) or a phase-change (crystalline to amorphous transitions) resulting in a change in reflectivity. In contrast, in magneto-optical ("MO") storage media, there is a change in the polarization of reflected light.

The spiral groove in the optical phase-change media may be prepared by embossing or imaging. For example, the high quality sheet of the present process may be coated with a polymer layer and then embossed with a hot stamper to produce a spiral groove. In the alternative, a photopolymer may be applied to the high quality sheet of the present process and the grooves defined by lithographic processes, after which the coating is cured. The polymers useful in coating the high quality optical sheet for use in phase-change media must have a sufficiently high glass transition temperature to withstand subsequent high temperature deposition steps of the encoding process. The width and pitch of the spiral groove depend on the construction of the particular medium but are typically in the 0.1 to 10 micron range, and preferably in the 0.4 to 2 micron range. The spot sizes of encoded information are typically in the 0.4 to 10 micron range.

The recordable medium useful in recordable optical phase-change media depends upon the particular phase-change medium, and is well known to those skilled in the art. For example, in CD-R the recordable medium typically consists of a dye, such as cyanine or phthalocyanine, together with other polymer additives in a solvent which is spun coated onto the grooved substrates. Any dye is suitable as long as it does not interact with the high quality plastic substrates so as to distort the groove pattern or warp the substrate. Suitable dyes include organic dyes, inorganic pigments and mixtures thereof. The dye coating is then dried, metallized and coated with a UV curable resin to produce the final CD-R.

MO storage media comprise a high quality substrate, a magneto-optical layer disposed on at least one side of the substrate, a reflective or semireflective layer disposed on the magneto-optical layer and optionally a protective layer disposed on at least one side of the substrate. In MO media, the magnetooptical layer, such as various alloys of cobalt, such as GdFeCo or TbFeCo, is sputtered onto the grooved substrates. Additional layers may be deposited on the cobalt alloy layer to aid in heat transfer to and from the substrate. Magnetic domains are then written using a combination of a focused laser to provide localized heating and a magnetic head to invert polarity of the domain. In CD-RW and DVD-RW, a combination of layers are deposited onto the grooved high quality plastic substrate, such as those described in M. Elphick, *Data Storage*, Penwell, Nashua, N.H., September, 1998, page 85. Such layers comprise a lower protective layer, such as $ZnS.SiO_2$, a recordable layer, such as $Ge_2Sb_2Te_5$, an upper protective layer, an upper reflective metal layer and finally a protective UV curable lacquer.

The high quality sheet of the present invention is suitable for use as substrates in storage media where the reading laser beam is reflected and not transmitted through the substrate. In such storage media, the reading laser beam is focused onto the substrate and recording medium using a solid immersion lens (SIL). These lenses glide over the surface at a distance of a fraction of the wavelength of light, typically at a distance of 10 to 100 nanometers. In this application, the substrate does not have to be optically transparent; however, it is essential that the recording medium have very low roughness. This application of near field optics is described in Mansfield et al., *Appl. Phys. Lett.*, 57, 1990, page 2615.

Multilayer storage media are a means of increasing data storage densities. In such storage media, 2 or more layers are used to store data instead of using a single layer of replicated pits as in a CD or 2 to 4 layers as in a standard DVD. For example, U.S. Pat. Nos. 4,450,553, 5,202,875, 5,263,011, 5,373,499 and 5,627,817 describe multilayer storage media. In a multilayer medium, it is desirable that the total thickness of the medium is equal to 1.2 millimeters in order for it to be compatible with current standards. Thus, a 6 or 12 layer medium requires each substrate layer to have a thickness of 0.2 or 0.1 millimeters, respectively. It is well known in the art that current methods of injection molding are incapable of producing such thin substrates having the required optical properties. Such thin, injection-molded substrates will be warped and have high stress and birefringence. In contrast, the high quality sheet of the present invention may be used to prepare thin substrates having a very smooth surface, low stress and low birefringence.

The methods described above for replicating pit structures on single layer CD can also be applied advantageously to multilayer storage media. For example, one or more polymer layers (coatings) may be applied to the substrate, such as by a continuous processes. Once coated, data are encoded on the sheet by embossing with a hot stamper. In the alternative, a photopolymer may coated on the substrate and the data encoded by optical imaging (lithography). Once the data are encoded on the substrate, a semireflective metallic or narrow bandpass dielectric layer is applied to each substrate layer so that light will be reflected from each substrate layer. The individual substrate layers are then laminated together using adhesive tie layers to form the desired multilayer storage medium.

The high quality sheet of the present invention is also useful as substrates in multilayer rewriteable storage media. In such media, once the individual sheets are formed and coated, they are embossed with a spiral groove pattern. A medium, such as a phase change or MO medium, is then sputtered onto the plastic substrate, followed by the application of a semireflective metallic or narrow band dielectric layer. The individual substrate layers are then laminated together using adhesive tie layers to form the desired multilayer storage medium.

When the high quality sheet of the present invention is used in magnetic storage media, the magnetic storage media comprise a high quality plastic sheet produced by the present process having a magnetic alloy disposed on at least one side of the sheet. Any high quality plastic sheet of the present invention is suitable for use as a substrate in magnetic storage media. It is preferred that the magnetic alloy be applied to the high quality sheet by sputtering. Optionally, the high quality sheet may further comprise stiffening agents. Stiffening agents are useful in applications where the high quality sheet requires increased modulus (stiffness). Suitable stiffening agents include, but are not limited to glass fibers, talc, silicon nitride, clay, and mixtures thereof. The present sheet offers the advantage of being lighter, smoother, stiffer and tougher than known substrates for magnetic storage media, such as aluminum discs.

The high quality sheet of the present invention is also useful as a substrate for 3-dimensional ("3-D") optical storage media. 3-D optical storage media are useful in any application requiring high density date storage, such as computer hard drives or similar data storage devices. Such 3-D optical storage media differ from conventional two-dimensional storage media, such as CD-ROM or magnetic storage media, in that information is stored in 3-dimensional space and not just in the plane of the substrate. This results in a many fold increase of the storage capacity from gigabyte per square-inch (per 6.45 square-cm) to terabyte per cubic-inch (per 16.39 cubic-cm). Several examples of 3-D optical storage media are known. These include those based on inorganic materials (or pigments), such as $LiNbO_3$, and organic materials (or dyes). Examples of organic materials useful in 3-D optical storage media include photochromic dyes, which undergo reversible coloration and bleaching upon optical excitation by a polarized laser beam; side chain liquid crystal polymers, which orient in the electric field of a laser beam causing a change in the local birefringence; amorphous polymers with side chains containing dye molecules, where the dye molecules are attached with flexible spacers to the main chain and orient in the polarized laser beam causing a change in the local birefringence; polymers with azo containing dye molecules in the side chain; light sensitive protein molecules which undergo electronic transitions upon excitation in a laser beam; photorefractive materials; and photopolymers.

Typically, 3-D optical storage media utilize polarized light to cause a local change in optical properties, i.e. through changes in birefringence or absorption. A laser, preferably polarized, is typically used as the light source in 3-D optical storage media as such media require the light source to be able to focus on a specific point, generally of submicron size. The narrow line width of a laser allows for such focusing on a specific point. For example, in such 3-D optical storage media using organic materials, a polarized laser beam causes a cis-trans transition in the dye which changes the absorption spectrum and local optical density. It is therefore essential that the medium have very small birefringence so as not to distort the laser beam which is used to write in the molecule. The medium must have very small birefringence when reading the stored information. It is well appreciated to those experienced in the art, that the matrix must have a very small birefringence, so that the writing laser beam causes a measurable change in local optical properties resulting in a large signal to noise ratio ("SNR"). If the matrix had a high birefringence, then the SNR would be low and it would be very difficult to read the data stored in 3-D space.

Thus, the high quality optical sheet of the present invention can be used to make 3-D optical storage media by dispersing in such sheet one or more pigments, dyes or mixtures thereof. It is preferred that the pigments, dyes or mixtures thereof is selected from $LiNbO_3$, photochromic dyes, side chain liquid crystal polymers, amorphous polymers with side chains containing dye molecules, polymers with azo containing dye molecules in the side chain; light sensitive protein molecules, photorefractive materials; and photopolymers. It is also possible to blend in any molecule, polymer, pigment or other inorganic material that undergoes an electronic ransition to change its absorbance, an orientation in the electric field of a polarized aser beam resulting in a change in the local refractive index, or a chemical reaction, uch as crosslinking, to cause a change in refractive index.

Typically, the dye, pigment or mixture thereof is incorporated into the optical sheets of the present invention by combining the dye, pigment or mixture thereof with the molten plastic resin prior to shaping the molten resin into a web using an overflow die.

The sheet produced by the present process is suitable for use in circuit board manufacture, particularly for use as a substrate for circuit layers. Multilayer printed circuit boards are used for a variety of applications and provide notable advantages of conservation of weight and space. A multilayer board is comprised of two or more circuit layers, each circuit layer separated from another by one or more layers of dielectric material. Circuit layers are formed by applying a copper layer onto a polymeric substrate. Printed circuits are then formed on the copper layers by techniques well known in the art, for example print and etch to define and produce circuit traces.

After lamination, the multiple circuit layers are connected by drilling through-holes through the board surface. Resin smear from through-hole drilling is removed under rather stringent conditions, for example treatment with concentrated sulfuric acid or hot alkaline permanganate, and then through-holes are further processed and plated to provide a conductive interconnecting surface. Prior to lamination, the circuit layers are typically treated with an adhesion promoter to improve bond strength between each circuit layer and the interleaving resin layers. One favored method of improving such bond strength is oxidative treatment of a circuit layer to form copper oxide surface coating thereon.

When the sheet produced by the process of the present invention is used as a substrate for microoptic lens arrays, the arrays may be produced by any suitable means for producing optical storage media. Suitable microoptic lens arrays include, but not limited to, rectilinear prisms, two dimensional arrays of pyramids, diffractive lenses and holographic lens arrays. For example, a hot embosser may be used to emboss an array of lenses on the sheet of the present invention. It is preferred that the hot embosser is used in a compression molding press. It is preferred that the sheet of the present invention is selected from the group consisting of homopolymers and copolymers of polycarbonate, polystyrene, polyacrylic, polyester, polyolefin, polyacrylate, and mixtures thereof. Such microoptic lens arrays are useful in display and imaging applications requiring the refraction or diffraction of light. Such applications include, but are not limited to: heads-up displays; large screen displays; and as lens arrays in office equipment, such as photocopiers and facsimile machines. Lenses used in microoptic arrays are typically 10 to 100 microns. In holographic lenses, the height is typically a fraction of the wavelength of light and the lateral dimensions are typically 10 to 100 microns.

When the optical quality sheet of the present invention has a structured surface, such sheet is suitable for use as a light management or light directing film. Light directing films have transmission properties that control, and are governed by, the angle of incidence of light. For example, light directing films consist of a polymeric film with a rectilinear periodic array of angled prisms embossed on one surface, i.e. a structured surface. The light directing film acts as a light collimator accepting light from the light source through its flat surface, and transmitting it through its structured face. Light which is incident upon a smooth surface of this film at relatively high incidence angles is refracted at the smooth surface and the structured surface of the film and is emitted from the sheet, having been redirected toward the normal to the smooth surface of the film. Additionally, light which strikes the structured surface internally at greater than the critical angle undergoes total internal reflection from both side surfaces, or facets, of a prism element and is directed back toward the light source. However, when light is incident upon the structured side of the film and subsequently transmitted to the flat surface of the film, the complementary behavior is observed. Namely, that light incident at angles close to the normal plane of the light directing film are transmitted, and those light rays incident at higher angles are reflected back via total internal reflection. Such light management or light directing films are particularly suitable for use in LCD illumination systems, such as backlight illumination.

Typically, a structured surface is provided to the optical sheets of the present invention by embossing the structures on the surface of the sheet while it is still warm, or on a cooled sheet by using a hot embosser. It is preferred that the structured surface be provided by coating the optical sheet of the present invention with a curable prepolymer having suitable viscosity, embossing the desired structured surface on the prepolymer coating, and then curing the prepolymer. It is preferred that the prepolymer be UV-curable. Prepolymers that can coat the optical sheet of the present invention and that retain any embossed structure during curing have suitable viscosity for use in light management films.

The sheet produced by the present invention is also suitable for use in waveguide optics. Suitable waveguide optics include, but are not limited to: waveguides, active and passive photonic switches, wavelength division multiplexers, electroluminescent light sources, and electrooptic modulators. When used in these applications, the waveguide optics may be embossed on the sheet in the same way as microoptic arrays. The advantage to waveguides fabricated from the sheets of the present invention is that they may be fabricated in large sheets and the expense and difficulty of known methods is avoided. In waveguide optic applications, it is preferred that the sheet is selected from the group consisting of homopolymers and copolymers of polycarbonate, polystyrene, polyacrylic, polyester, polyolefin, polyacrylate, and mixtures thereof.

The sheet of the present invention may also be used in the manufacture of microfluidic devices. Such devices include, but are not limited to: miniature diagnostic systems for biopharmaceutical applications, miniature devices for directing fluid flow, miniature sensor devices for pharmaceutical and biochemical applications, and three-dimensional microfluidic systems. When used in these applications, it is preferred that the sheet is selected from the group consisting of homopolymers and copolymers of polycarbonate, polystyrene, polyacrylic, polyester, polyolefin, polyacrylate, and mixtures thereof.

Depending on the particular use for sheet produced by the method of the present invention, sheet characteristics such as low shrinkage, low birefringence, and surface quality may vary in relative importance. Desired sheet thickness will also vary depending on the particular use, but will generally be about 25 mm or less, preferably 10–5000$\mu$, and most preferably 50–1000$\mu$. Sheet thickness can be adjusted by varying the speed of delivery of the molten polymer to the die or by varying the speed of the take-off means. Thickness variation over a sample length of 400 mm should be generally 10% or less, preferably 5% or less, and most preferably 1% or less.

A typical apparatus of the present invention is shown in FIGS. 1–4. As will become clear to those skilled in the art, variations from the apparatus illustrated in these Figures may be made within the scope of the present invention.

Molten polymer from a source 10 is delivered to an overflow die 20 via channel 12 (preferably controlled by delivery means 14), where it is introduced to the die 20 through conduit opening 21 to conduit 22. The temperature of the molten polymer as it is delivered to die 20 is maintained by use of heaters 15 located in close proximity to die 20. As the molten polymer fills the opening 21, it is forced out through the metering arrangement, slot 23, onto the die lips 40 and 41, and flows out around the sides 24 and 25 of the die 20. At the apex 26 of the die 20, the molten polymer flowing from sides 24 and 25 converge to form the beginning of molten web 27.

The molten web 27 is picked up at its edges by two pairs of guidance means, (e.g., tank treads 31, 32, 33 and 34) which guide the molten web away from die 20. As molten web 27 is guided away from die 20, the temperature of the web gradually falls below the glass transition temperature of the polymer, and results in cooled sheet 40. In an optional embodiment, cooling means 36 located in close proximity to the guidance means 31, 32, 33, 34 aid in lowering the temperature of the web.

Molten resin can be supplied in any of a number of ways. For example, the molten resin may be supplied from a polymerization reactor, a mixer, a devolatilization device (e.g., a flash column, falling strand devolatilizer or wiped film evaporator), or an extruder. An extruder is preferred, as it can also act as a polymer delivery means (see discussion below). It is most preferred to use a single screw extruder, although a double (twin) screw extruder or a multiple screw extruder may also be used. If a twin or multiple screw extruder is used, it can be of any type, for example, counter-rotating, co-rotating, intermeshing or non-intermeshing. It will be appreciated that well-known techniques for handling or preparing resins can be used in the present process. Such techniques include drying, use of inert atmospheres, pellet dedusting, and the like.

The molten resin may contain one or more plastic additives such as antioxidants, ultra-violet ('UV') absorbers, UV stabilizers, fluorescent or absorbing dyes, anti-static additives, release agents, fillers and particulates. The type and amount of additive used with particular resins for particular purposes is known to those skilled in the plastic arts and will not be further detailed herein.

The temperature at which the resin is processed will depend upon the composition of the resin and may vary during processing. The temperature must be sufficiently high that the resin will flow but not so high as to degrade the resin. Operating conditions will vary depending on the type of polymer to be processed, and are within ranges known to those skilled in the art. However, as a general guideline, the operating temperature will be between 100 and 400° C. For example, PMMA may be processed in an extruder with the extruder barrel temperature of 150 to 260° C. and a melt temperature of 150 to 260° C. Other polymers such as polycarbonate or poly methylmethacrylimide can also be used at appropriately higher melt temperatures (200–330° C.). It is preferred that volatile materials and undesired particulate matter be removed from the molten plastic resin prior to sheet formation. This may be accomplished in accordance with methods known to those skilled in the art.

Delivery means 14 for delivering constant flow of the molten polymer are required for the purpose of regulating the flow rate and providing the pressure required to deliver the molten polymer through the channel 12, conduit opening 21 and conduit 22, to the die 20. The delivery means may include any type of mechanical melt pump, including, but not limited to any appropriate extruder (as described above), gear pump, or combinations thereof. In simple form, the delivery means may be a gravity feed, or hydrostatic pressure. The delivery means may be selected in accordance with methods known to those skilled in the art. The use of a gear-type melt pump is preferred because it provides control of flow rate and minimizes flow rate fluctuations, resulting in more uniform sheet thickness. In addition, the use of a melt pump may reduce degradation of the molten resin by reducing the shear heating of the polymer. Temperatures for the melt pump are determined by the plastic resin used, and are similar to those used in standard extrusion processes, typically between 50 and 200° C. above the Tg of the resin. More than one delivery means may be used, for example, for the production of wide sheets. In the present invention, the delivery means should provide molten polymer to the inlet of the overflow die in the range of 50 to 70,000 kpa, preferably 300 to 7000 kPa, and most preferably 1000 to 3500 kPa.

In one embodiment, the polymer melt is passed through a melt filter or a mixer between the delivery means 14 and the die 20. It is preferred that the polymer melt is passed through a melt filter and then a mixer. The filter removes gels, dirt and foreign particles from the melt. The mixer blends the polymer in order to minimize thermal gradients in the melt and removes flow lines resulting from the melt filter. Any melt filter may be used in the present process. Suitable melt filters include candle filters and disc filters. It is preferred that the filter is a disc filter. Any mixer may be used in the present process, such as static mixers or rotary mixers. The use of a melt filter and mixer produces plastic sheet having better quality in terms of smoothness and thickness control.

The overflow die is used to form a sheet from the molten plastic resin. The die includes a metering arrangement and an overflow surface with converging sides which in cross section culminate in an apex. The die in lengthwise fashion can be substantially linear, curved, oval or circular. The die height to width ratio should generally be in the range of 1:1 to 10:1, preferably 2:1 to 5:1, and most preferably 2.5:1 to 4:1. The length (or circumference) to height ratio should generally be at least 1:2, preferably at least 2:1, and most preferably at least 3:1.

Figure 5A:
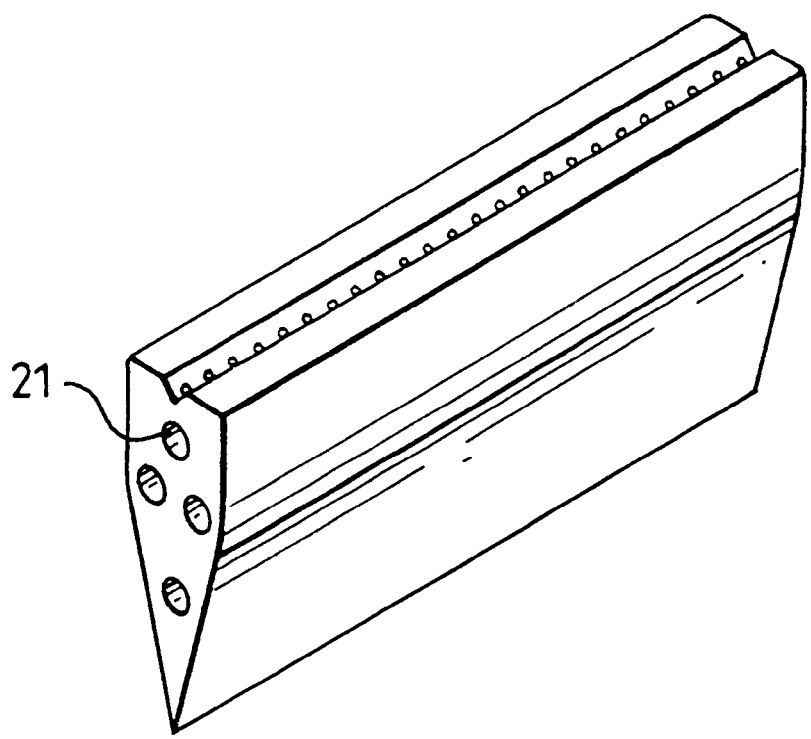
FIGS. 5–7 are alternate embodiments of the overflow die of the present invention.
Figure 5B:
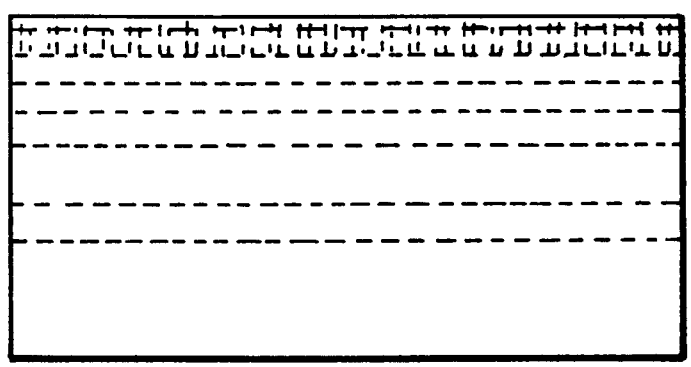
Figure 6A:
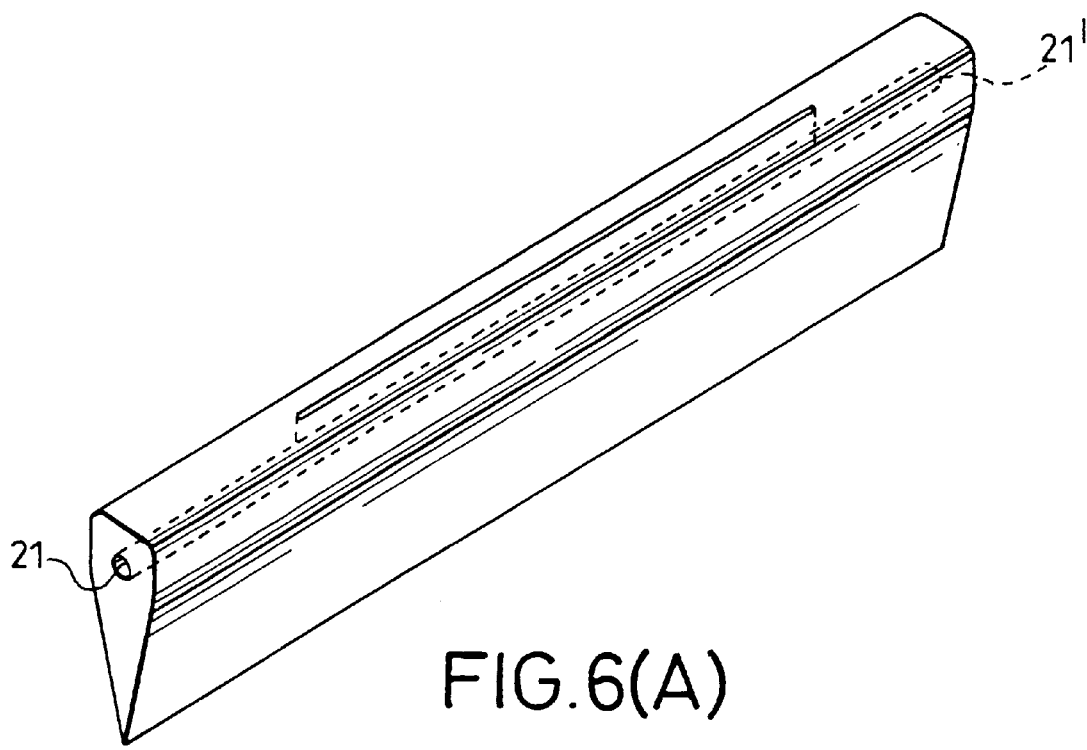
Figure 6B:
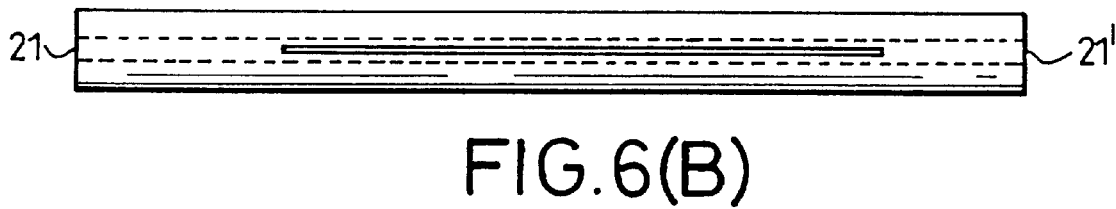
Figure 6C:
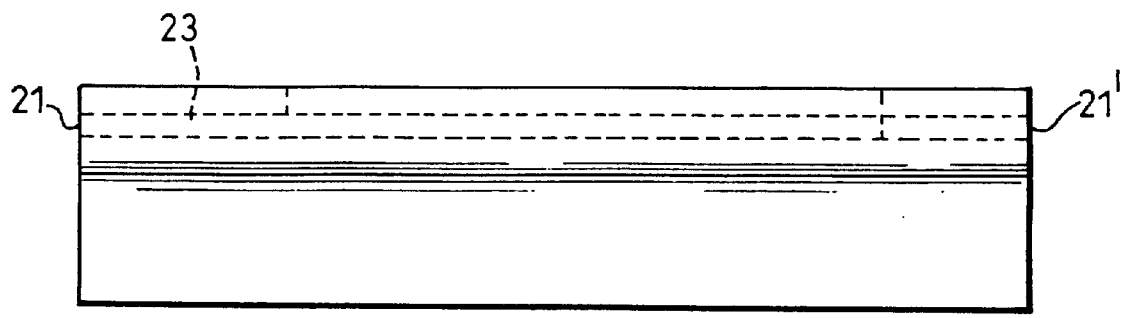
Figure 7A:
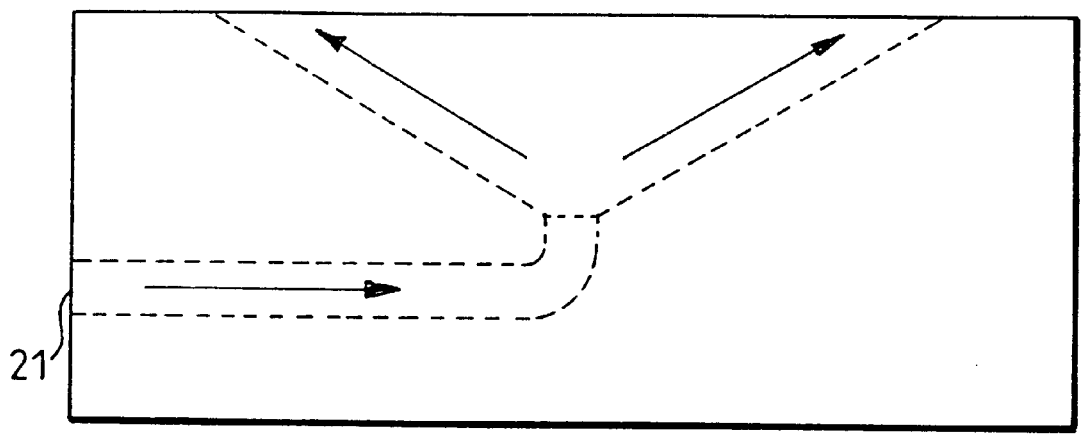
Figure 7B:
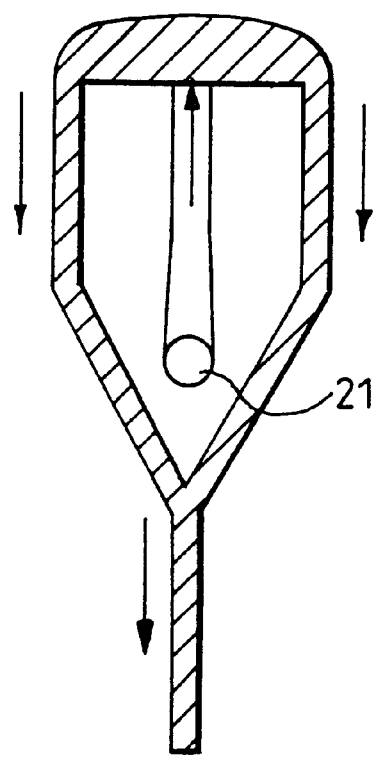

The metering arrangement portion of the overflow die consists of flow distribution elements such as, for example, holes, slot, "coat hanger" arrangement or combinations thereof, which control the flow distribution of the molten resin across the die, thereby controlling the sheet thickness profile. Examples of such metering arrangements are illustrated in FIGS. 5–7. Other metering arrangements may be used as known to those skilled in the art. A slot arrangement is preferred. The length of the die will depend upon the width of the sheet to be made, but the ratio of the mean slot gap (mean width of the slot 23) to mean conduit diameter (mean diameter of the conduit 22) should generally be at least 1:5, preferably at least 1:10, and most preferably at least 1:20. For sheets having a finished thickness of 1 mm or less, a substantially constant slot width across the die is preferred. For greater thicknesses, a tapered slot is preferred wherein the slot is thinner at the feed end, and thicker at the opposing end. If a wide sheet is desired, conduit openings 21 and 21' (see FIG. 6) can be located at both ends of the die, and it is possible to have the slot 23 tapered at both ends.

The overflow surface is formed by the exterior of the die 20 and consists of a pair of die lips, 40 and 41, which connect with the metering arrangement and direct the molten polymer to the converging sides, 24 and 25. The converging sides direct the melt flow to the apex 26, where the melt web exits from the die. Although the overflow surface can be textured or smooth, it is preferably smooth. Moreover, the overflow surface is preferably highly polished to minimize variations and defects in the sheet. The overflow surface may be treated with a coating (for example, electroplating or other depositing techniques) to improve die surface smoothness, provide corrosion resistance, or improve the flow properties over the die.

The material of construction of the die is important. Metals are preferred due to their high thermal conductivity, good corrosion resistance, high modulus, and ability to be polished. However, other materials such as glass and ceramics can, in principle, be used. It is preferred to use stainless or tool grade steel.

If a non-planar sheet is desired, the die geometry may be modified accordingly, using methods known to those skilled in the art. For example, if a curved sheet is desired, the die can be curved along its longitudinal axis.

In general, it is desired to maintain the viscosity of the molten plastic (for a shear rate of 10 sec$^{-1}$) between 1 and 10,000 Pa-s, preferably between 5 and 1,000 Pa-s, and most preferably between 10 and 500 Pa-s. In addition, the melt flow rate per unit die length (flow rate divided by the length) is typically in the range of $1.0 \times 10^{-3}$ to 10 g/s/cm, preferably $1.0 \times 10^{-2}$ to 1.0 g/s/cm, and most preferably $2.0 \times 10^{-2}$ to $2.0 \times 10^{-1}$ g/s/cm. The viscosity can be controlled by varying the temperature. Depending on the die design, the temperature control may be more or less important. The more even the temperature across the die, the more even the thickness of the sheet. It is preferred that the melt temperature be uniform across the die. Thickness variation resulting from uneven temperature distribution down the length of the die can be minimized by changing the design of the slot or other metering arrangement. Temperature control may be accomplished, for example, by one or more of the following: electric cartridge heaters, infrared lamp heaters, heated oil (or other heat transfer fluid), heat pipes, or microwave heaters. Heated oil or other heat transfer fluids are preferred because the temperature may be controlled by a thermostat and uniformity of temperature may be readily accomplished. The die is preferably housed within a partially enclosed area in order to minimize temperature fluctuations. It is preferred that an inert environment also be used. Such inert environment minimizes coloration and degradation of the resin.

It is preferred, but not essential, that the molten plastic flows in a downward direction after passing over the die, since the downward flow is affected by gravity. The rate of flow is determined by a combination of the effect of gravity, and the tension applied by the takeoff means. By conducting the plastic flow in a downward direction over the die, gravity acts in the same direction as the sheet flow, thereby reducing the tension needed in the takeoff means and improving sheet quality. The molten plastic after passing through the die is in a form known as a "web."

The takeoff means transports the molten plastic web from the die at a controlled speed and allows the web to cool. The takeoff means may be, for example, rollers or a "tank tread" arrangement, whereby only the outer edges of the sheet come into contact with the takeoff means. A "tank tread" arrangement is preferred, as this maximizes the smoothness of the sheet surface. A tank tread arrangement is illustrated as part of the apparatus of FIGS. 1 and 2 as 31, 32, 33 and 34.

The takeoff means controls the speed at which the plastic sheet is produced, which at a given polymer flow rate determines the thickness of the sheet; therefore, control of the speed of the takeoff means is quite important. The takeoff means also supports the weight of the sheet, thereby maintaining consistent sheet width and thickness. It is desirable to position the takeoff means as close as possible to the die so that the amount of molten resin that is unsupported is minimized. The distance from the apex of the die to the takeoff system (e.g., the nip area at the top of the tank tread arrangement) is typically <25 cm, preferably <10 cm, and most preferably <5 cm.

The sheet takeoff speed will vary depending on the type of sheet desired, and the thickness. For example, for a sheet having 0.4 mm thickness, the sheet takeoff speed will generally be in the range of 10 to 1000 cm/min, preferably 20 to 200 cm/min, and most preferably 50 to 100 cm/min; whereas for a sheet having 1 mm thickness, the takeoff speed will generally be in the range of 5 to 500 cm/min, preferably 10 to 100 cm/min, and most preferably 25 to 50 cm/min. In like fashion, the residence time during cooling in the takeoff system before bending will vary. For example, for a sheet having 0.4 mm thickness, the residence time before bending will generally be $\geq 10$ sec, preferably $\geq 1$ min, and most preferably $\geq 2$ min; whereas for a sheet having 0.2 mm thickness, the residence time before bending will generally be $\geq 5$ sec, preferably $\geq 30$ sec, and most preferably $\geq 1$ min.

The plastic sheet may be allowed to cool by natural convection during transport by the takeoff system, or by forced convection. Natural convection consists of passive cooling of the sheet during passage through air or a fluid bath. Forced convection is accomplished by pumping or blowing a heat transfer fluid along or against the sheet to enhance heat transfer. Natural convection is preferred for minimizing sheet ripples and surface marks. It is preferred to use a clean fluid (free from particulates) for cooling the sheet to prevent surface contamination or defects. For example, HEPA filters may be used with air or gas cooling for this purpose. Any fluid or combinations of fluids can be used for sheet cooling, provided that the fluid used is not detrimental to the plastic material being processed. Examples of useful cooling fluids are: air, nitrogen, water, oils, and glycols. It is possible to combine the cooling process with a coating process by using a suitable coolant which acts as a coating and is deposited as a film on the plastic sheet as it leaves the cooling bath.

It will be recognized by those skilled in the art that a variety of optional equipment may be used following the takeoff means. Examples of optional equipment include conventional film handling equipment such as film winders, edge cutters, sheet cutters, and packaging equipment. In addition, other downstream devices can be utilized, for example, forming equipment, coating equipment, decorating equipment, and laminating equipment.

The process of the present invention may be used with any suitable plastic resin, and is preferably used with thermoplastic resins. A thermoplastic resin is a polymeric resin which reversibly softens when exposed to heat and hardens upon cooling. Thermoplastic resins may be linear or branched polymers that are not substantially cross-linked. It is preferred that the thermoplastic resins useful in the process of the present invention have virtually no crosslinking and have thermal stability (for residence time of up to 10 min or more) at melt processing temperatures (i.e., having a viscosity on the order of $10^3$ Pa-s). Examples of thermoplastic resins for which the process of the present invention is useful include but are not limited to: homopolymers or copolymers of acrylic acid, methacrylic acid and their esters, including but not limited to copolymers formed with styrene and its derivatives, N-alkyl maleimides, acrylonitrile, and vinyl acetate; phenoxy ethers; polyphenylene oxide resins, epoxy resins; cellulosic resins; vinyl polymers such as polyvinyl chloride ("PVC"); fluoropolymers such as fluorinated ethylene-propylene and poly(vinylidene fluoride); polystyrenes; polyolefins such as polyethylene, polypropylene, poly-4-methylpentene-1, and including cyclic olefin polymers and copolymers, such as those based on norbornene and functionalized norbornene monomers; polysulfones; polyether sulfones; polyether ketones; polyether imides; polyphenylene sulfides; polyarylene ester resins; polyesters; homopolymers or copolymers of N—H and/or N-alkyl glutarimide; acrylonitrile-butadiene-styrene resins ("ABS"); styrene-acrylonitrile resins ("SAN"); styrene-maleic anhydride resins ("SMA"); imidized SMA; polyamides ("Nylons"); polycarbonates, including high temperature homopolymers and copolymers; polycarbonate-polyesters; polyarylates; liquid crystal polymers; and mixtures thereof. Suitable polycarbonates comprise one or more bisphenols and one or more carbonic acids. Suitable carbonic acids include, but are not limited to: phosgene, diphosgene, triphosgene, carbonic acid esters, such as chloroformic acid esters, and mixtures thereof. Suitable bisphenols include, but are not limited to: bis(4-hydroxyphenyl) alkanes and cycloalkanes; bis(3-substituted-4-hydroxyphenyl) alkyl-cycloalkanes; bis(3,5-disubstituted-4-hydroxyphenyl) alkylcycloalkanes, such as 2,2-bis(4-hydroxyphenyl)propane; 2,2-bis(3-methyl-4-hydroxyphenyl)propane; 2,2-bis(3,5-dimethyl-4-hydroxyphenyl)propane; 1,1-bis(4-hydroxyphenyl) cyclohexane; 2,2-bis(3-phenyl-4hydroxyphenyl)propane; 2,2-bis(3isopropyl-4-hydroxyphenyl)propane; 2,2-bis(4-hydroxyphenyl)butane; 9,9-bis(4-hydroxyphenyl)fluorene; 9,9-bis(4-hydroxy-3-methylphenyl)fluorene; 1,1-bis(4-hydroxyphenyl)-3,3,5-trimethylcyclohexane; 1,1-bis (4hydroxyphenyl)-3,3-dimethylcyclohexane; 1,1-bis(3,5-dimethyl-4-hydroxyphenyl)-3,3,5-trimethylcyclohexane; 1,3-bis(4-hydroxyphenyl)-5,7-dimethyladamantane; 1,1-bis (4-hydroxyphenyl)-1-phenylethane; 4,4'-dihydroxy-tetraphenylmethane; 2,2-bis(4-hydroxyphenyl)propane; 6,6'-dihydroxy-3,3,3',3'-tetramethyl-1,1'-spiro(bis)indane; and mixtures thereof. The polyester-polycarbonates useful in the present invention comprise one or more bisphenols, one or more carbonic acids, and one or more additional acids, such as terephthalic and isophthalic acids. The polycarbonates and polyester-polycarbonates useful in the present invention are well known in the art. Mixtures of thermoplastic resins may also be used. Particularly useful thermoplastic resin mixtures include, for example: SAN-polyglutarimide, polycarbonate-polyester, PMMA-poly(vinylidene fluoride), polystyrene-poly(phenylene oxide), and polycarbonate blends, including blends bisphenol A polycarbonate and high temperature polycarbonate copolymers, such as a copolymer of 2,2-bis(4-hydroxyphenyl)propane and 1,1-bis(4-hydroxyphenyl)-3,3,5-trimethylcyclohexane, available as APEC polycarbonate (Bayer Corp.). Preferred resins for use in the process and apparatus of the present invention are: polycarbonates; linear acrylic homopolymers and copolymers; cyclic polyolefins; and linear imidized acrylic homopolymers and copolymers such as those described in U.S. Pat. No. 4,727,117 (Hallden-Abberton et al.) and U.S. Pat. No. 4,246,374 (Kopchik).

The plastic resins useful in the present invention typically result from addition polymerization or condensation polymerization processes. Addition polymerization processes include bulk polymerization and solution or dispersion polymerization in water or organic solvent media; such processes are well known in the art and may incorporate cationic, anionic, or free radical initiation and propagation reactions. Condensation polymerization processes include bulk, solution and dispersion polymerization processes. Plastic resins formed by polymerization processes other than bulk polymerization may require subsequent treatment in order to isolate the resin.

The following examples are presented to illustrate further various aspects of the present invention, but are not intended to limit the scope of the invention in any respect.

EXAMPLE 1

Preparation of Acrylic Film

This example illustrates the method of the present invention used to produce optical quality acrylic sheet.

PMMA resin having an average molecular weight of 110,000 was starve-fed into a 2 inch (5 cm) diameter single screw vented two-stage extruder having a 30:1 L:D ratio at a rate of 3.1 g/s using a volumetric feeder. The extruder barrel had a temperature profile from 204° C. at the feed end to 274° C. at the discharge end. The resin was devolatilized using a devolatilization vent operating at 720–750 mm Hg. The screw was rotated at 30 rpm. A gear-type melt pump was used to pump the molten resin through a screen pack filter to a 12" (30 cm) long overflow die having a 1.27 cm diameter internal conduit and a series of 22 metering holes with a spacing of 1.27 cm. The diameter of the metering holes increased from the feed end of the die to the downstream end from 3.18 mm to 3.73 mm. The melt pump temperature was 274° C. The melt pump suction pressure was 2100 kPa. and the melt pump discharge pressure was approximately 4100 kPa. The overflow die was heated internally using three electric cartridge heaters and externally using three IR heating units to a temperature of 274° C. The molten web formed at the apex of the die was conveyed using two pairs of tank treads, and cooled using cooled forced air which was applied using two air plenums.

The resultant sheet had average thickness of 0.325 mm, surface roughness Rq of 14.6 nm and an optical retardance of <5 nm.

EXAMPLE 2

Preparation of Imidized Acrylic Sheet

This example illustrates the method of the present invention used to produce optical quality imidized acrylic sheet.

A capped imidized acrylic resin having an weight average molecular weight of 108,000 and a glass transition temperature of about 180° C. was starve-fed into a 2 inch (5 cm) diameter single screw vented two-stage extruder having a 30:1 L:D ratio at a rate of 2.5 g/s using a gravimetric feeder. The extruder barrel had a temperature profile from 246° C. at the feed end to 329° C. at the discharge end. The resin was devolatilized using a devolatilization vent operating at 720–750 mm Hg. The screw was rotated at 30 rpm. A gear-type melt pump was used to pump the molten resin through a screen pack filter to a 25.5 inch (65 cm) long overflow die with a 1.588 cm diameter internal conduit and a 16 inch (40 cm) long slot tapering from 0.038 to 0.042 inch (0.965 to 1.067 mm). The melt pump temperature was 329° C. The melt pump suction pressure was approximately 4100 kPa. The melt pump discharge pressure was approximately 1650 kPa. The die was heated using a hot oil system (oil temperature=343° C.) via internal holes in the die, and the air around the die was heated with a forced-air oven (temperature=280° C.). The molten web formed at the apex of the die was conveyed using two pairs of tank treads operating at a speed of 1.2 cm/s, and cooled by natural convection of room air.

A 200 mm×200 mm piece was cut from the cooled sheet and tested. The resultant sheet had a thickness of 0.390 mm, with a variation of ±0.015 mm. The surface waviness Wy and Wq were <0.5$\mu$ and 0.18$\mu$ respectively, surface roughness Rq was 7.6 NE, and the optical retardance was <6 NE. The thermal shrinkage, measured at a temperature of 160° C., was 0.03% or less.

EXAMPLE 3

Preparation of Polycarbonate Sheet

This example illustrates the method of the present invention used to produce optical quality polycarbonate sheet.

Extrusion-grade polycarbonate resin (Lexan 101, GE Plastics, Pittsfield, Mass.) was starve-fed into a 2 inch (5 cm) diameter single screw vented two-stage extruder having a 30:1 L:D ratio at a rate of 4.4 g/s using a gravimetric feeder. The extruder barrel had a temperature profile from 232° C. at the feed end to 315° C. at the discharge end. The resin was devolatilized using a devolatilization vent operating at 720–750 mm Hg. The screw was rotated at 30 rpm. A gear-type melt pump was used to pump the molten resin through a screen pack filter to a 37.5 inch (95 cm) long overflow die with a 1.905 cm diameter internal conduit and a 28 inch (71 cm) long slot tapering from 0.038 to 0.045 inch (0.965 to 1.143 mm). The melt pump temperature was 315° C. The melt pump suction pressure was approximately 3400 kPa. The melt pump discharge pressure was approximately 1300 kPa. The die was heated using a hot oil system (oil temperature=315° C.) via internal holes in the die, and the air around the die was heated with a forced-air oven (temperature=260° C.). The molten web formed at the apex of the die was conveyed using two pairs of tank treads operating at a speed of 1.2 cm/s, and cooled by natural convection of room air.

A 400 mm×400 min piece was cut from the cooled sheet and tested. The resultant sheet had an average thickness of 0.43 mm, with a variation of ±0.02 mm in both the transverse and machine directions. Wy was <1$\mu$, Wq was 0.15$\mu$, the surface roughness Rq was <10 nm, and the average optical retardance was 20 nm with a variation of 10 nm. Thermal shrinkage, measured at 130° C., was 0.02%.

EXAMPLE 4

Preparation of Polycarbonate Film

This example illustrates the method of the present invention used to produce optical quality polycarbonate film.

Extrusion-grade polycarbonate resin (Lexan 101, GE Plastics, Pittsfield, Mass.) was starve-fed into a 2 inch (5 cm) diameter single screw vented two-stage extruder having a 30:1 L:D ratio at a rate of 2.5 g/s using a gravimetric feeder. The extruder barrel had a temperature profile from 232° C. at the feed end to 315° C. at the discharge end. The resin was devolatilized using a devolatilization vent operating at 720–750 mm Hg. The screw was rotated at 30 rpm. A gear-type melt pump was used to pump the molten resin through a screen pack filter to a 37.5 inch (95 cm) long overflow die with a 1.905 cm diameter internal conduit and a 28 inch (71 cm) long slot tapering from 0.038 to 0.045 inch (0.965 to 1.143 mm). The melt pump temperature was 315° C. The melt pump suction pressure was approximately 3400 kPa. The melt pump discharge pressure was approximately 1300 kPa. The die was heated using a hot oil system (oil temperature=315° C.) via internal holes in the die, and the air around the die was heated with a forced-air oven (temperature=250° C.). The molten web formed at the apex of the die was conveyed using two pairs of tank treads operating at a speed of 3.1 cm/s, and cooled by natural convection of room air.

A 400 mm×400 mm piece was cut from the cooled sheet and tested. The resultant film had an average thickness of 54μ, with variation ±4μ in both the transverse and machine directions, and an optical retardance of <10 nm.

EXAMPLE 5

Preparation of High Temperature Polycarbonate Blend Sheet

A pre-compounded blend of 2.33 parts APEC DP9-9371 a polycarbonate copolymer available from Bayer, Corp., Pittsburgh, Pa., with a Tg of 205° C. to 1 part Makrolon DP-1265 a low molecular weight polycarbonate, also available from Bayer, Corp., with a Tg of 150° C. was starve fed into an extruder at a rate of 2.5 g/s using a gravimetric feeder. The extruder was a 5.08 cm (2 inch) diameter two stage single screw vented extruder having a 30:1 L:D ratio, a 10 cc/rev gear-type melt pump, melt filter, rotary mixer and overflow die. All process equipment was purged with nitrogen gas prior to start-up. The resin was devolatilized using a devolatization vent operating at 720–750 mm Hg. The screw was rotated at 30 RPM. The gear pump was used to meter the molten resin through a 5 micron sintered metal fiber melt filter (pleated candle type). The flux of resin across the filter was 8.6 lb./hr./sq.ft. at a pressure drop of 3800 kPa. The extruder barrel had a temperature profile from 273° C. at the feed end to 304° C. at the discharge. The melt filter was maintained at 322° C. The extruder feed hopper and oven around the overflow die were inerted with nitrogen to minimize the formation of crosslinked gels in the resin. After exiting the melt filter, the resin entered a rotary mixer where the molten polymer was mixed at 165 RPM. The mixer barrel temperature was maintained at 325° C. The molten resin exited the mixer and entered the 37.5" (95 cm) long overflow die with a 1.905 cm diameter internal conduit and a 28 inch (71 cm) long slot tapering from 0.038 to 0.045 inch (0.965 to 1.143 mm). The die entrance pressure was about 700 kPa and was maintained at a temperature of 321° C. by circulating hot oil through internal passages. The nitrogen around the die was heated to 240° C. with a forced convection oven. The molten web formed at the apex of the die was conveyed using pairs of tank treads operating at a speed of 0.7 cm/s and cooled by natural convection of room air.

A 400 mm×400 mm piece was cut from the cooled sheet and tested. The resultant sheet had a thickness of 0.420 mm, with a variation of +/−0.020 mm. Gel counts were less than 200/sq. meter. The surface waviness Wy and Wq were 1 μm and 0.17 μm respectively. Surface roughness Rq was <10 nm. The optical retardance was <20 nm. The thermal shrinkage measured at a temperature of 160° C. was <0.05%.

EXAMPLES 6–8

Fabrication of Optical Storage Media

Three 1.2 mm polycarbonate sheets are prepared according to Example 3. To each sheet is applied a polymer coating as described below. Once the sheet is coated, it is then embossed using a hot stamper. The stamper contains bumps to create submicron pits in the plastic sheet. The hot stamper is applied to each of the sheets with pressure for a few seconds. After embossing, the sheets are then coated with a reflective metal layer using a sputtering coater. The metal layer on each sheet is then coated with a UV curable polyacrylate. The sheets are then cut in a press to provide 120 mm discs suitable for use in optical storage media.

| Example # | Polymer Coating |
|---|---|
| 6 | Euderm 50UD |
| 7 | S1828 |
| 8 | Norland 61 |

Euderm 50UD is a latex coating, available from the Rohm and Haas Company, Philadelphia, Pa.

S1828 is a photopolymer, available from Shipley Company, Marlborough, Mass.

Norland 61 is a UV curable resin, available from Norland Company, New Brunswick, N.J.

Test Methods

The following test methods were used to test the sheets made in the Examples above. It is understood in the art that these test methods are exemplary in nature, and that the results are not method-dependent.

A. Optical retardance

The retardance of light at 632.8 nm wavelength was determined in the following manner. A polarized laser beam (polarized at −45° with respect to the laboratory frame) was passed through the plastic sheet, and then through a photoelastic modulator (PEM) (Model PEM-90, Hinds Instruments, Inc.; Hillsboro, Oreg.) oriented with optical axis set to 0° in the lab frame. The PEM voltage was set at ¼ wave retardance (158.2 nm). The light then was passed through a second linear polarizer (polarization axis +45°) and intensity detected by a silicon diode detector (Model PDA-50, ThorLabs Inc.; Newton, N.J.). The PEM and detector were modulated, and the signal from the detector processed by a lock-in amplifier (Model 5210, E G & G Princeton Applied Research; Princeton, N.J.). The plastic sheet was rotated perpendicular to the laser beam to find the maximum signal. The retardance was determined by comparing the maximum signal to that measured for a standard ¼ wave plate.

Birefringence of a material can be obtained by dividing the optical retardance of a material by its thickness. For example, if the optical retardance for a 0.4 mm thick sheet of plastic is 4 nm, the birefringence of the materials is 0.00001. For optical quality plastic sheet made by the method of the present invention, birefringence of a material is considered to be low if it is ≦0.0002, preferably ≦0.00005, and most preferably ≦0.00001.

B. Sheet waviness

Sheet waviness (Wy and Wq) was measured using a stylus profiler (Surfanalyzer System 5000, Federal Products; Providence, R.I.) with a procedure similar to that of SEMI Standard D15-1296. The measured profile was digitally filtered with a Gaussian long wavelength cutoff (8 mm). Wy is the difference between maximum and minimum values in an 20 mm sampling length, and Wq is the root mean square average deviation of the filtered profile from the mean line calculated over 8 mm, and averaged over a 80 mm evaluation length. For high quality sheet produced by the method of the present invention, Wy should be ≦2.0μ, preferably ≦1.0μ, and most preferably ≦0.5μ.

C. Sheet roughness

Sheet roughness (Rq) was measured using a stylus profiler (Dektak 3-30, Veeco/Sloan; Santa Barbara, Calif.) with a procedure similar to that of SEMI Standard D7-94. The measured profile was digitally filtered with a Gaussian long wavelength cutoff (0.08 mm) and a short wavelength cutoff (0.0025 mm). The evaluation length was 0.4 mm. The roughness parameter (Rq) is the root mean square average deviation of the filtered profile from a mean line. The average value from three different measurements was reported. For high quality sheet produced by the method of the present invention, Rq should be ≦50 nm, preferably ≦10 nm, and most preferably <5 nm.

D. Shrinkage

Shrinkage was determined by directly measuring the sample length before and after heat treatment. Multiple measurements were made to determine the length of a dry piece of plastic. The accuracy of the measurement was 0.005%. The sample was heated to a set temperature below its $T_g$ for 4 hours. Upon cooling to room temperature, the length was again determined by multiple measurements. The percentage change in length before and after the heating cycle was reported as the shrinkage. For high quality sheet produced by the method of the present invention, the shrinkage should be ≦0.10%, preferably ≦0.075%, and most preferably ≦0.05%.

Gel Counting Test Method:

Gels counts were measured by projection of sheet defects onto a screen by means of an overhead projector. Nine 3×3 cm areas on each 400 mm×400 mm sheet were subject to counting. The number of surface defects projected onto the screen within each of the 3×3 cm squares was counted, and the numbers averaged to give a total gel count for the sample.

What is claimed is:

1. A 3-dimensional optical storage medium comprising a high quality plastic sheet having dispersed thereon one or more pigments, dyes or mixtures thereof, wherein the pigments, dyes or mixtures thereof undergo a change in optical properties locally upon exposure to light; wherein the optical storage medium is produced by the steps of:

a) providing molten plastic resin;
   b) directing the molten plastic resin to an overflow die having an inlet and an outlet;
   c) shaping the molten plastic resin into a molten web using said overflow die;
   d) combining the pigment, dye or mixture thereof with the molten plastic resin prior to shaping the molten resin into a web using said overflow die;
   e) guiding said molten web away from said overflow die; and
   f) cooling said molten web to form a solid;

wherein the high quality plastic sheet has a birefringence of less than or equal to 0.0002.

2. The 3-dimensional optical storage medium of claim 1 wherein the resin is a thermoplastic resin selected from the group consisting of: homopolymers or copolymers of acrylic acid, methacrylic acid and their esters; phenoxy ethers; polyphenylene oxide resins; cellulosic resins; vinyl polymers; fluoropolymers; polystyrenes; polyolefins; polysulfones; polyether sulfones; polyether ketones; polyether imides; polyphenylene sulfides; polyarylene ester resins; polyesters; homopolymers or copolymers of N—H and/or N-alkyl glutarimide; acrylonitrile-butadiene-styrene resins; styrene-acrylonitrile resins; styrene-maleic anhydride resins; imidized styrene-maleic anhydride resins; polyamides; polycarbonates; polycarbonate-polyesters; polyarylates; liquid crystal polymers; and mixtures thereof.

3. The 3-dimensional optical storage medium of claim 2, wherein the thermoplastic resin is selected from the group consisting of: polycarbonates; linear acrylic homopolymers and copolymers; cyclic polyolefins; and linear imidized acrylic homopolymers and copolymers.

4. The 3-dimensional optical storage medium of claim 3 wherein the resin is a polycarbonate or polycarbonate-polyester comprising of one or more bisphenols selected from the group consisting of bis(4-hydroxyphenyl) alkanes and cycloalkanes; bis(3-substituted-4-hydroxyphenyl) alkyl-cycloalkanes; bis(3,5-disubstituted-4-hydroxyphenyl) alkylcycloalkanes; 2,2-bis(3-methyl-4-hydroxyphenyl) propane; 2,2-bis(3,5-dimethyl-4-hydroxyphenyl)propane; 1,1-bis(4-hydroxyphenyl)cyclohexane; 2,2-bis(3-phenyl-4-hydroxyphenyl)propane; 2,2-bis(3-isopropyl-4-hydroxyphenyl)propane; 2,2-bis(4-hydroxyphenyl)butane; 9,9-bis(4-hydroxyphenyl)fluorene; 9,9-bis(4-hydroxy-3-methylphenyl)fluorene; 1,1-bis(4-hydroxyphenyl)-3,3,5-trimethylcyclohexane; 1,1-bis(4-hydroxyphenyl)-3,3-dimethylcyclohexane; 1,1-bis(3,5-dimethyl-4-hydroxyphenyl)-3,3,5-trimethylcyclohexane; 1,3-bis(4-hydroxyphenyl)-5,7-dimethyladamantane; 1,1-bis(4-hydroxyphenyl)-1-phenylethane; 4,4'-dihydroxy-tetraphenylmethane; 2,2-bis(4-hydroxyphenyl) propane; 6,6'-dihydroxy-3,3,3',3'-tetramethyl-1,1'-spiro(bis)indane; and mixtures thereof.

5. The 3-dimensional optical storage medium of claim 3, wherein the thermoplastic resin is bisphenol A polycarbonate.

6. The 3-dimensional optical storage medium of claim 1 further comprising a protective layer.

7. The 3-dimensional optical storage medium of claim 6 wherein the protective layer is laquer or resin.

8. The 3-dimensional optical storage medium of claim 1 further comprising information encoded thereof.

9. The 3-dimensional optical storage medium of claim 1 wherein the sheet has a waviness of less than or equal to 2.0 m in a profile over a 20 mm sampling length.

10. The 3-dimensional optical storage medium of claim 1 wherein the sheet has a thickness variation of 10% or less over a sample length of 400 mm.

11. The 3-dimensional optical storage medium of claim 1 wherein the sheet has a shrinkage of less than or equal to 0.10%.

12. A 3-dimensional optical storage medium comprising a high quality plastic sheet having dispersed thereon one or more pigments, dyes or mixtures thereof, wherein the pigments, dyes or mixtures thereof undergo a change in optical properties locally upon exposure to light; wherein the optical storage medium is produced by the steps of:

a) providing molten plastic resin;
b) directing the molten plastic resin to an overflow die having an inlet and an outlet;
c) shaping the molten plastic resin into a molten web using said overflow die;
d) combining the pigment, dye or mixture thereof with the molten plastic resin prior to shaping the molten resin into a web using said overflow die;
e) guiding said molten web away from said overflow die; and
f) cooling said molten web to form a solid;

wherein the high quality plastic sheet has a shrinkage of less than or equal to 0.10%.

13. A 3-dimensional optical storage medium comprising a high quality plastic sheet having dispersed thereon one or more pigments, dyes or mixtures thereof, wherein the pigments, dyes or mixtures thereof undergo a change in optical properties locally upon exposure to light; wherein the optical storage medium is produced by the steps of:

a) providing molten plastic resin;
b) directing the molten plastic resin to an overflow die having an inlet and an outlet;
c) shaping the molten plastic resin into a molten web using said overflow die;
d) combining the pigment, dye or mixture thereof with the molten plastic resin prior to shaping the molten resin into a web using said overflow die;
e) guiding said molten web away from said overflow die; and
f) cooling said molten web to form a solid;

wherein the high quality plastic sheet has a thickness variation of 10% or less over a sample length of 400 mm.

* * * * *